United States Patent [19]

Kawamura

[11] Patent Number: 4,836,444
[45] Date of Patent: Jun. 6, 1989

[54] DEVICE FOR CONTROLLING HEATER FOR MOTOR VEHICLE

[75] Inventor: Hideo Kawamura, Samukawa, Japan

[73] Assignee: Isuzu Motors Limited, Tokyo, Japan

[21] Appl. No.: 129,285

[22] Filed: Dec. 7, 1987

[30] Foreign Application Priority Data

Dec. 10, 1986 [JP] Japan .................. 61-294160

[51] Int. Cl.$^4$ .............................. B60H 1/02
[52] U.S. Cl. ...................... 237/2 A; 62/236; 237/12.3 C
[58] Field of Search .......... 62/236; 237/12.3 C, 237/12.3 A, 12.3 B, 12.3 R

[56] References Cited

U.S. PATENT DOCUMENTS 3,974,660 8/1976 Farr ......................................... 62/236
4,703,888 11/1987 Kawamura et al. ............ 237/12.3 C

FOREIGN PATENT DOCUMENTS 1451609 2/1964 Fed. Rep. of Germany .
2906859 9/1980 Fed. Rep. of Germany .
3433765 3/1986 Fed. Rep. of Germany .
2372533 6/1978 France .

OTHER PUBLICATIONS

Patent Abstract of Japan, vol. 11, No. 48 (M-561)[2495], 1987, JP-A-61 211 118 (Isuzu Motors Ltd).

Primary Examiner—Henry A. Bennet
Attorney, Agent, or Firm—Staas & Halsey

[57] ABSTRACT

A device controlling a heater or warmer on an automobile has a charger for charging, with an external commercial electric power supply, a battery which serves as a power supply for energizing an atomizing glow plug which heats and atomizes fuel, an igniting glow plug which ignites the fuel as atomized by the atomizing glow plug, and blowers. The device also has a driver for driving the blowers with electric power produced by rectifying the power from the commercial electric power supply. The glow plugs of a high power requirement are energized by the battery even while the automobile is at rest, and the battery is charged by the charger. The blowers are driven by electric power produced by rectifying the power from the commercial electric power supply.

8 Claims, 3 Drawing Sheets

DEVICE FOR CONTROLLING HEATER FOR MOTOR VEHICLE

BACKGROUND OF THE INVENTION

The present invention relates to a device for controlling a heater or warmer for automobiles for transporting foods, chemicals, and the like while keeping them warm.

Automobiles for transporting foods, chemicals, and the like while keeping them warm require a heat source. Japanese Laid-Open Patent Publication No. 61-211118 discloses a burner device as such a heat source for use with a heater or warmer for an aubomobile, the burner device comprising a burner for combusting fuel, a heat exchanger for recovering heat generated by the burner, and a controller for controlling the fuel combustion in the burner in response to the temperature detected in a heating or warming container.

Automobiles with heating or warming containers, especially those for delivering food early in the morning, should preferably be loaded with food in the previous night because no loading process will be required in the next morning. To do so, the heater or warmer should be continuously operated throughout the night. However, since the conventional heater including a burner is energized by a battery on the automobile, the heater cannot be continuously kept in operation due to the limited capacity of the battery.

One attempt to solve the above problem, the inventor has led to an automotive heating or warming container which, as disclosed in Japanese Patent Application No. 60-299344, comprises a burner for combusting fuel, a heat exchanger for recovering heat generated by the burner and introducing heated or warm air into the heating container, a controller for controlling the heated air to be supplied to the heating container based on a temperature signal from a temperature sensor located in the heating container, and a voltage control unit for converting the voltage of a commercial electric power supply to a voltage equal to that of a battery mounted on the automobile. While the automobile is running, the above various components are energized by the battery, and while the automobile is at rest, the components are energized by the commercial electric power supply.

The burner includes an atomizing glow plug for heating and atomizing fuel and an igniting glow plug for igniting the fuel as atomized by the atomizing glow plug. Since the atomizing and igniting glow plugs should be supplied with a large electric current, the voltage control unit requires, as a voltage converter, a transformer and a rectifier which are of a large current capacity. Therefore, the control device for the heating container is large in size and expensive to manufacture.

SUMMARY OF THE INVENTION

It is an object of the present invention to provide a device for controlling a heater or warmer for an automobile, wherein when the automobile is at rest, electric power is supplied from an external commercial electric power supply, atomizing and igniting glow plugs of a high power requirement are energized by a battery on the automobile, and the battery is charged and a blower and other components are energized by the commercial electric power supply.

According to the present invention, there is provided a device for controlling a heater on an automobile having a burner including an atomizing glow plug for heating and atomizing fuel and an igniting glow plug for igniting the fuel as atomized by the atomizing glow plug, a heat exchanger for recovering heat from a combustion gas emitted by combusting fuel in the burner, a combusting blower for supplying combusting air into the burner, a hot air blower for introducing warming air into the heat exchanger and supplying hot air into a heating container, and a battery for supplying electric power to the glow plugs and the blowers, the device comprising charging means for charging the battery with a commercial electric power supply, and driver means for driving the combusting and hot air blowers with the commercial electric power supply.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
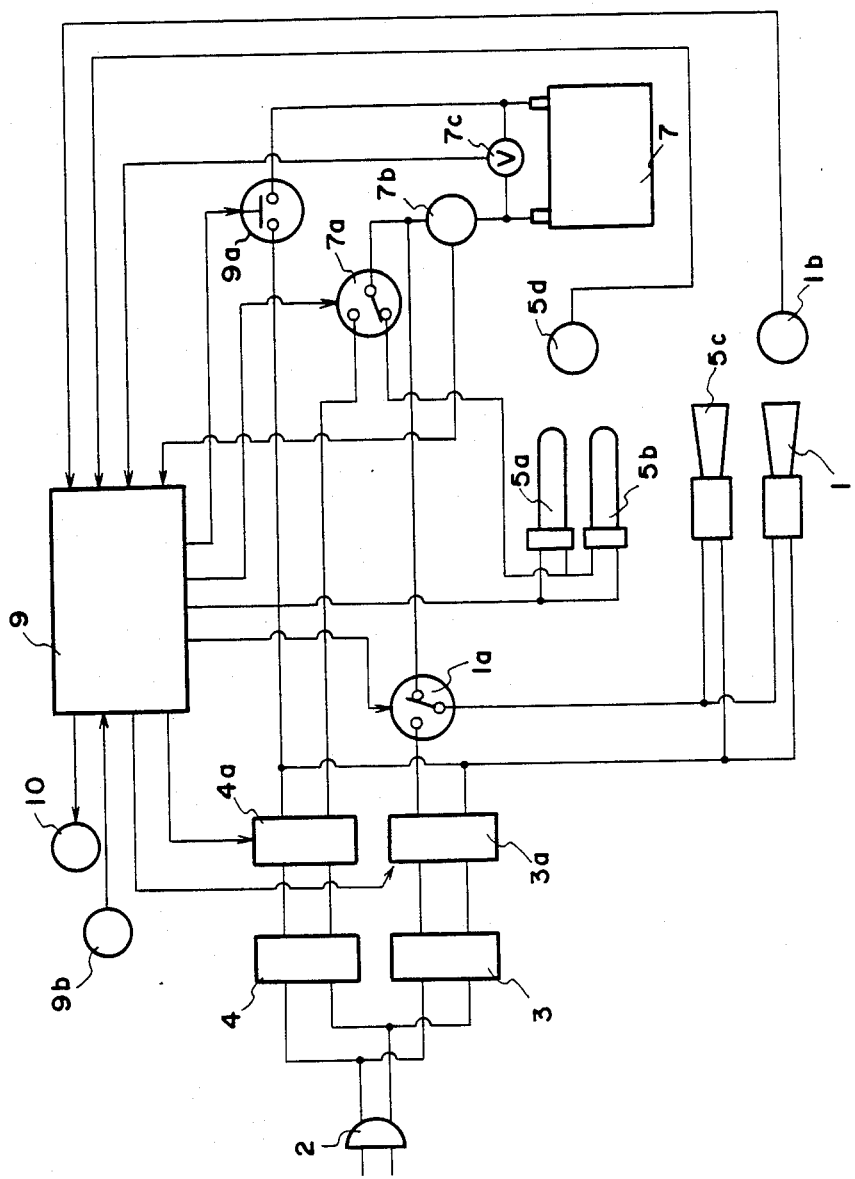
FIG. 1 is a block diagram of a device for controlling a heater or warmer for an automobile according to an embodiment of the present invention.

FIG. 1 shows a device for controlling a heater or warmer for an automobile according to the present invention.

Figure 2:
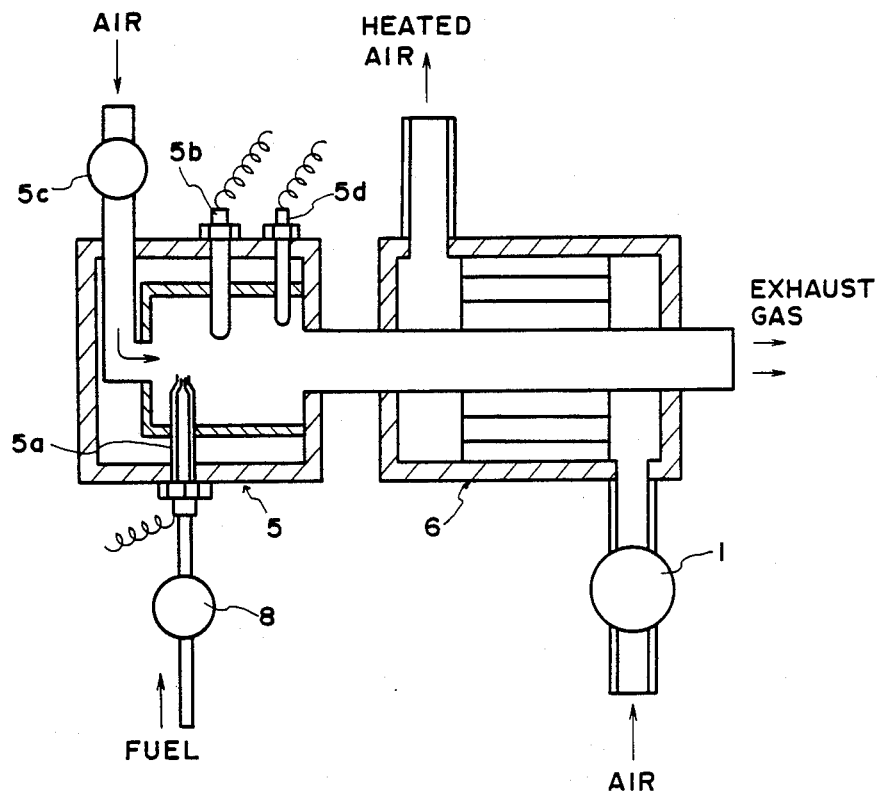
FIG. 2 is a cross-sectional view of a burner and a heat exchanger of the heater.

As shown in FIGS. 1 and 2, a hot air blower 1 supplies a heating or warming container with hot air heated in a heat exchanger 6 by heat of a combustion gas emitted by combusting fuel in a burner 5. While the automobile is at rest, the hot air blower 1 is supplied with electric power from a commercial electric power supply via an AC inlet 2, a rectifier 3, and a switching regulator 3a for supplying hot air.

The burner 5 has an atomizing glow plug 5a for atomizing supplied fuel and an igniting glow plug 5b for igniting atomized fuel. Each of these glow plugs 5a, 5b is made of a ceramic material and includes therein a heater of a high power requirement. When the glow plugs 5a, 5b are energized by a battery 7, fuel supplied under pressure from a fuel pump 8 is atomized by the atomizing glow plug 5a and mixed with air fed from a combusting blower 5c into a combustible air-fuel mixture, which is then ignited by the igniting glow plug 5b to produce a high-temperature combustion gas. The combustion gas is then delivered to a heat exchanger 6 positioned downstream of and coupled to the burner 5, the combustion gas serving as a heat source for hot air to be deliverd into the heating container by the hot air blower 1. A flame sensor 5d issues an ON/OFF signal dependent on the condition of combustion in the burner 5. More specifically, when the fuel is combusted well to keep the temperature in the burner above a prescribed temperature and hence the plugs are not required to be energized, the flame sensor 5d issues an ON signal to a controller 9. When the fuel is not combusted sufficiently and the temperature in the burner is below the prescribed temperature, requiring the plugs to be energized by the battery, the flame sensor 5d applies an OFF signal to the controller 9. A blower switch 1a is operated under a command from the controller 9 to supply the hot air blower 1 and the combusting blower 5c with electric power from either the battery 7 or the AC inlet 2.

A rectifier 4 and a switching regulator 4a serve as charging means for charging the battery 7 by converting the AC power from the external power supply to DC power and effecting switching operation to control a current to charge the battery 7. When a battery switch 9a is turned on and a plug switch 7a is shifted to charge the battery 7 under commands from the controller 9, the battery 7 is charged through an integrator 7b. The integrator 7b integrates a current discharged from the battery 7. That is, when the plug switch 7a is shifted toward the plugs and the atomizing and igniting glow plugs 5a, 5b are energized by the battery 7, the current discharged from the battery 7 is integrated by the integrator 7b. When the battey 7 is charged by the commercial power supply, the integrator 7b integrates the charging current and transmits a signal indicative of the stored electric energy to the controller 9. The voltage between the terminals of the battery 7 is detected by a voltmeter 7c.

A container temperature sensor 1b detects the temperature in the heating container. An atmospheric or ambient temperature sensor 9b detects the temperature of air outside the automobile. Signals from these sensors 1b, 9b are applied to the controller 9.

The controller 9 comprises a microcomputer including a central processing unit for effecting various processing operations, a memory for storing a control program to control the various switches and switching regulators in response to signals from the sensors, and an input/output device. The controller 9 applies control signals to the switching regulators 3a, 4a and the switches, and also controls a signal lamp 10.

Figure 3:
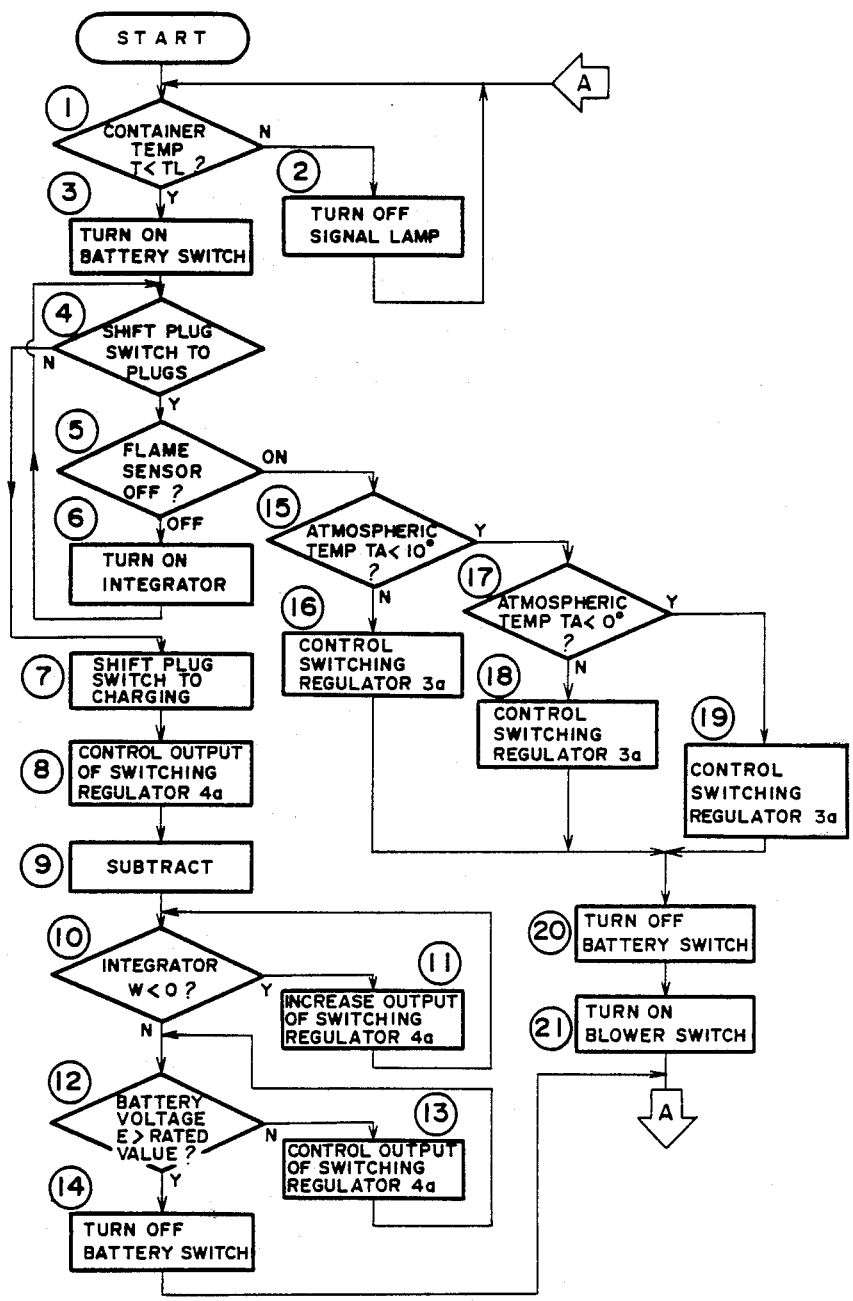
FIG. 3 is a flowchart of an operation sequence of the control device.

Operation of the control device according to the present invention will be described with reference to FIG. 3.

In a step 1, to determine the temperature in the heating container, a signal T from the container temperature sensor 1b is read in to ascertain whether the container temperature T is lower than a prescribed temperature TL required for keeping materials such as foods warm in the heating container. If the temperature T is higher than TL, the heater or warmer is not required to operate, and hence the signal lamp 10 is de-energized in a step 2. If T<TL, the heater should be operated, and control goes to a step 3 to close the battery switch 9a. In a step 4, the plug switch 7a is shifted toward the plugs to supply electric power from the battery 7 to the atomizing glow plug 5a and the igniting glow plug 5b to enable the burner 5 to combust fuel.

A next step 5 checks the condition in which fuel is combusted in the burner 5. If the fuel is not well combusted and hence the flame sensor 5d generates an OFF signal, the current from the battery 7 is continuously - supplied to the atomizing glow plug 5a and the igniting glow plug 5b to keep the fuel combusted. Control proceeds to a step 6 in which the integrator 7b is operated to integrate the current discharged from the battery 7.

If the plug switch 7a is shifted to charge the battery 7 in the step 4, electric power supplied from the AC inlet 2 and converted to DC power by the rectifier 4 is controlled by the switching regulator 4a to charge the battery 7. The current as it charges the battery 7 is subtracted from the integrated discharged current by the integrator 7b (steps 7 through 9).

A step 10 checks the integrated value W of the integrator 7b. If the integrated value W does not reach 0, the output from the switching regulator 4a is increased to keep the battery 7 charged in a step 11. If the integrated value W reaches 0, then control goes on to a step 12 which checks the voltage E of the battery 7 based on a signal from the voltmeter 7c. If the battery voltage E does not reach a rated voltage thereof, then the output from the switching regulator 4a is controlled to charge the battery 7 in a step 13. When the battery 7 is completely charged and if the voltage E exceeds the rated voltage, e.g., 13 V, then the battery switch 9a is turned off to finish the charging operation in a step 14. The function of the integrator may be effected by the controller 9 which integrates the product of the current and voltage with respect to time for thereby measuring electric power.

If the fuel is well combusted in the burner 5 and hence the flame sensor 5d issues an ON signal in the step 5, control goes to a step 15 which checks an atmospheric temperature signal TA from the atmospheric temperature sensor 9b. If the temperature TA is lower than 10° C., then control proceeds to a step 17. If the temperature TA is higher than 10° C., then the switching regulator 3a is controlled in a step 16 to convert the electric power as converted to DC power by the rectifier 3 to a prescribed low voltage under switching control. In a step 20, the battery switch 9a is turned off so as not to use the battery 7, and the blower switch 1a is shifted toward the AC inlet to drive the combusting blower 5c and the hot air blower 1 with electric power from the switching regulator 3a.

If the temperature TA detected by the atmospheric temperature sensor 9b is higher than 0° C. in the step 17, then the switching regulator 8a is controlled in a step 18 to convert the DC power from the rectifier 3 to a prescribed medium voltage, and thereafter the combusting blower 5c and the hot air blower 1 are driven in the steps 20, 21. If the temperature TA is lower than 0° C. in the step 17, the switching regulator 8a is controlled in a step 19 to convert the DC power from the rectifier 3 to a prescribed high voltage, and thereafter the combusting blower 5c and the hot air blower 1 are driven. In this manner, the amount of combusting air and the amount of hot air supplied to the heating container, dependent on the atmospheric temperature, are controlled by the voltage supplied from the switching regulator 3a.

With the aforesaid embodiment, as described above, there are provided charging means for charging, while the automobile is at rest, the battery which serves as the power supply for the glow plugs and the blowers, and driver means for driving the blowers while the automobile is at rest. Even when the automobile is stopped, the glow plugs of a high power requirement are energized by the battery that can be charged through the charging means by the external commercial AC electric power supply, and the blowers can be driven by the driver means. Therefore, even during an engine shutdown, the heating container can be operated by the energy from the battery and the commercial AC electric power supply. Since the glow plugs are energized by the battery, a transformer and a rectifier which are of a large current capacity are not required as a converter for the electric power supply. As a result, the device is small in overall size and inexpensive to manufacture.

According to the foregoing embodiment, moreover, inasmuch as the electric power to be supplied to the blowers is controlled according to the atmospheric or ambient temperature, and hence the temperature in the heating container can be controlled according to the atmospheric or ambient temperature.

Although a certain preferred embodiment has been shown and described, it should be understood that many changes and modifications may be made therein without departing from the scope of the appended claims.

What I claim is:

1. An apparatus for controlling a heater having a burner including an atomizing glow plug for heating and atomizing fuel and an igniting glow plug for igniting the fuel as atomized by the atomizing glow plug, a heat exchanger for recovering heat from a combustion gas emitted by combusting fuel in the burner, a combusting air blower for supplying combusting air into a heat exchanger and supplying hot air into a heating container, and a battery for supplying electric power to the glow plugs and the blowers, said apparatus comprising:

charging means for charging the battery with an AC electric power supply; and
   driver means for driving the combusting and hot air blowers with the AC electric power supply.

2. An apparatus according to claim 1, wherein said charging means comprises a rectifier for converting electric power from said AC electric power supply to DC electric power, and a switching regulator for controlling a charging current of the DC electric power from said rectifier.

3. An apparatus according to claim 1, wherein said driver means comprises a rectifier for converting electric power from said AC electric power supply to DC electric power, and a switching regulator for controlling the DC electric power from said rectifier to be of a prescribed voltage.

4. An apparatus according to claim 3, wherein said driver means further includes control means for controlling said switching regulator according to an ambient temperature.

5. An apparatus for controlling a heater having a burner including an atomizing glow plug for heating and atomizing fuel and an igniting flow plug for igniting the fuel as atomized by the atomizing glow plug, a heat exchanger for recovering heat from a combustion gas emitted by combusting fuel in the burner, a combusting air blower for supplying combusting air into the burner, a hot air blower for introducing warming air into the heat exchanger and supplying hot air into a heating container, and a battery for supplying electric power to the glow plugs and the blowers, said apparatus comprising:

charging means for charging the battery with an AC electric power supply;
   driver means for driving the combusting and hot air blowers with the AC electric power supply;
   means for cutting off the supply of electric power from said battery to said combusting and hot air blowers and supplying electric power from said AC electric power supply to said blowers, when electric power is supplied from said AC electric power supply; and
   control means for charging said battery through said charging means and supplying electric power from said battery to said glow plugs when electric power is supplied from said AC electric power supply.

6. An apparatus according to claim 5, wherein said charging means comprises a rectifier for converting AC electric power from said AC electric power supply to DC electric power, and a switching regulator for controlling a charging current of the DC electric power from said rectifier.

7. An apparatus according to claim 5, wherein said driver means comprises a rectifier for converting AC electric power from said AC electric power supply to DC electric power, and a switching regulator for controlling the DC electric power from said rectifier to be of a prescribed voltage.

8. An apparatus according to claim 7, wherein said driver means further includes control means for controlling said switching regulator according to an ambient temperature.

* * * * *